United States Patent Office 3,331,868
Patented July 18, 1967

3,331,868
A-NOR-B-NORSTEROIDS AND INTERMEDIATES
Kenneth G. Holden, Stratford, N.J., and James F. Kerwin, Broomall, Pa., assignors to Smith Kline & French Laboratories, Philadelphia, Pa., a corporation of Pennsylvania
No Drawing. Filed May 21, 1964, Ser. No. 369,320
11 Claims. (Cl. 260—488)

This invention relates to new chemical compounds having utility as pharmacodynamic agents and as intermediates for preparing other new compounds having similar therapeutic activity. More specifically these compounds have antiandrogenic, central nervous system depressant and antifertility activity. The antiandrogenic activity of these compounds is particularly useful.

The compounds of this invention are characterized by having the usual C and D rings as known to the steroid art but having contracted A and B rings in the same molecule, i.e., A-nor-B-nor structures.

Examples of these compounds are those having the following structural formula:

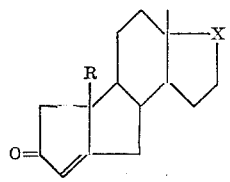

Formula I in which X represents

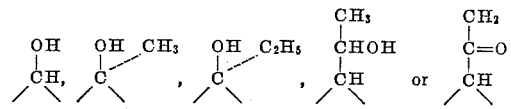

and R represents methyl or hydrogen. The compounds of Formula I in which X is

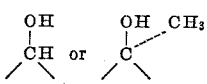

are preferred.

The compounds of this invention are prepared from the corresponding known B-norsteroids by the following procedure:

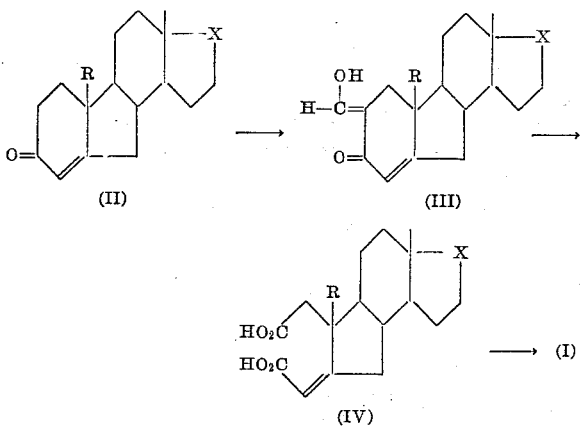

Of course when the X residue contains a keto group this group must be converted into the hydroxy derivative by reduction prior to the contraction of ring A due to the conditions under which these reactions are carried out. The hydroxy group is then oxidized to regenerate the keto group giving the desired compound in the A-nor-B-nor pregnane series.

The B-norsteroid starting material (II) is treated with a lower alkyl formate usually ethyl or methyl formate in the presence of a strong base such as sodium or potassium hydride, sodium or potassium lower alkoxide, etc. to form the 2-hydroxymethylene derivative (III). Most conveniently this reaction is carried out in an inert organic solvent such as benzene, toluene or xylene at about room temperature. The 2-hydroxymethylene intermediate of Formula III is a part of our invention.

This compound is oxidized, most conveniently with ozone in an inert organic solvent at 0° C., to the 2,3-secodicarboxylic acid (IV) another aspect of this invention. The seco compound is treated with a lower alkanoic anhydride usually at reflux to form the mixed anhydride which on further heating cyclizes and decarboxylates thereby forming the desired A-nor-B-nor structure. This may be isolated at this point as its O-acylate or, more conveniently, it may be saponified to the corresponding hydroxy compound and purified by chromatographic and/or crystallization procedures.

The O-acylates of the hydroxy-A-nor-B-norsteroids of this invention can be optionally prepared by methods known to the art such as at reflux in an excess of the acyl anhydride or in the presence of a solvent and/or tertiary organic base. Such acylates are those derived from pharmaceutically acceptable carboxylic acids of a maximum of 8 carbon atoms. Inert substituents as known to the art may be optionally substituted on these A-nor-B-norsteroids such as methyl, fluoro, hydroxy or acetoxy. The compounds having 11α, 17α or 21-hydroxy substituents in the bisnorpregnene series are of particular importance. The term "lower" used with an organic function means a maximum of 8 carbons preferably 1 or 2. The following examples will illustrate this invention.

*Example 1*

To a stirred solution of 20 g. of 17α-methyl-B-nortestosterone in 500 ml. of benzene is added a mixture of 22 ml. of ethyl formate and 10.5 g. of 53% sodium hydride as a mineral oil suspension. After stirring for 5 days at room temperature under nitrogen, the excess sodium hydride is destroyed by the addition of 30 ml. of methanol. The reaction mixture is poured into water and filtered. The benzene layer is separated from the filtrate and the aqueous phase is washed with ether. The filter cake and the aqueous phase are combined then acidified with phosphoric acid. Extraction of the resulting mixture with methylene chloride followed by evaporation of the dried methylene chloride extracts gives 2-hydroxymethylene-17α-methyl-B-nortestosterone, M.P. 200–201° C., after recrystallization from acetone-hexane.

A solution of 22.2 g. of 2-hydroxymethylene-17α-methyl-B-nortestosterone in a mixture of 600 ml. of ethyl acetate and 600 ml. of acetic acid is treated with 3.36 g. of ozone at 0° C. during 40 minutes. The reaction mixture is treated with 60 ml. of 30% hydrogen peroxide and 600 ml. of water then allowed to stand at room temperature for 48 hours. After diluting the reaction mixture with 1500 ml. of water it is extracted with ethyl acetate. The combined ethyl acetate extracts are dried and evaporated to a residue of crystalline 17β-hydroxyl-17α-methyl-2,3-seco-B-norandrost-4-ene-2,3,-dioic acid, M.P. 239–241° C.

A solution of 6.0 g. of 17β-hydroxy-17α-methyl-2,3-seco-B-norandrost-4-ene-2,3-dioic acid in 100 ml. of acetic anhydride is heated at reflux under nitrogen for 1 hour. The acetic anhydride is distilled off. The residue remaining is distilled under high vacuum. The latter distillate is dissolved in 100 ml. of alcohol containing 10 ml. of 40% aqueous sodium hydroxide then heated at reflux under nitrogen for 45 minutes. The reaction mixture is concentrated, diluted with water and extracted with methylene chloride. Evaporation of the combined dried methylene chloride extracts gives a residue which is chromatographed on 60 g. of alumina (activity III, Woelm). Elution with benzene-methylene chloride gives the crude product which is further purified by rechromatography and crystallization from ether-hexane to give 17α-methyl-A-nor-B-nortestosterone, M.P. 134–135° C.

17α-methyl-A-nor-B-nortestosterone (500 mg.) in 10 ml. of acetic anhydride is heated at reflux overnight Quenching in water gives the crude acetate derivative.

Example 2

A solution of 18 g. of B-norprogesterone in 200 ml. of tetrahydrofuran is lowly added to a stirred mixture of 5 g. of lithium aluminum hydride and 500 ml. of ether under a nitrogen atmosphere. After the addition is complete the reaction mixture is refluxed for 2 hours, cooled, treated slowly with 200 ml. of water, filtered and evaporated to give 3,20-dihydroxy-B-norpregn-4-ene. The crude product is dissolved in 200 ml. of dioxane and treated with a solution of 15 g. of 2,3-dichloro-5,6-dicyanobenzoquinone in 200 ml. of dioxane. The precipitated hydroquinone is removed by filtration and the filtrate is evaporated to a residue. The latter is purified by dissolving it in benzene-methylene chloride and filtering it through a column of 250 g. of alumina (activity III, Woelm). Evaporation of the filtrate gives 20-hydroxy-B-norpregn-4-en-3-one.

A mixture of 15 g. of the 20-hydroxy compound, 18 ml. of methyl formate, 7.8 g. of sodium hydride and 450 ml. of benzene is reacted for 6 days at room temperature. Methanol is added. After quenching in water and extraction as described above the desired 2-hydroxymethylene-20-hydroxy-B-norpregn-4-en-3-one is recovered.

This hydroxymethylene compound (12 g.) in 600 ml. of ethyl acetate-acetic acid is treated with 1.6 g. of ozone at 0° C. for 60 minutes. Hydrogen peroxide and water are added. After standing at room temperature for 2 days, the mixture is diluted with water and extracted with ethyl acetate to give the desired seco acid.

The acid (9 g.) in 150 ml. of acetic anhydride is heated at reflux for 2 hours. The excess anhydride is evaporated and the residue distilled. The distillate is dissolved in 150 ml. of ethyl alcohol containing 15 ml. of 40% sodium hydroxide then refluxed for 60 minutes. The reaction mixture is worked up as described in Example 1 to give 20-hydroxy-A-nor-B-norpregn-4-en-3-one.

This intermediate (3.2 g.) in 300 ml. of acetone is cooled at 0–5° C. while being titrated with a solution of 8 N chromic acid in 8 N sulfuric acid. After 3 minutes the mixture is diluted with water and extracted with ethyl acetate. Evaporation of the dried extracts gives the desired A-nor-B-norprogesterone.

Example 3

A mixture of 10 g. of 17α-methyl-19-nor-B-nortestosterone (M.P. 150–151° C.), 12 ml. of ethyl formate, and 5.2 g. of 53% sodium hydride in 300 ml. of toluene is reacted at room temperature for 7 days. After working up as in Example 1, 2-hydroxymethylene-17α-methyl-19-nor-B-nortestosterone is recovered. This compound (7.4 g.) in 200 ml. of ethyl acetate and 200 ml. of acetic acid is treated with 1.12 g. of ozone at 0° C. for 50 minutes. The reaction mixture is then treated with 20 ml. of 30% hydrogen peroxide and 200 ml. of water allowed to stand at room temperature for 36 hours. Working up as described above gives 17β-hydroxy-17α-methyl-2,3-seco-19-nor-B-norandrost-4-ene-2,3-dioic acid. The seco acid (2 g.) in 40 ml. of propionic anhydride is heated at reflux under nitrogen for 3 hours. The excess anhydride is removed and the residue vacuum distilled. The distillate is heated at reflux in methanol with 3.5 ml. of 40% sodium hydroxide solution for 1 hour. Working up as described gives 17α-methyl-19-nor-A-nor-B-nortestosterone.

Example 4

Substituting equivalent quantities of 17α-ethyl-B-nortestosterone, 19-nor-B-nortestosterone, B-nortestosterone, 17α-ethyl-19-nor-B-nortestosterone in the reactions of Example 1 give 17α-ethyl-A-nor-B-nortestosterone, 19-nor-A-nor-B-nortestosterone, A-nor-B-nortestosterone, and 17α-ethyl-19-nor-A-nor-B-nortestosterone and the respective 2-hydroxymethylene and 2,3-secodicarboxylic acid intermediates.

What is claimed is:
1. A chemical compound of the formula:

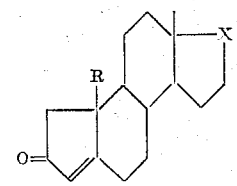

in which X is a member selected from the group consisting of

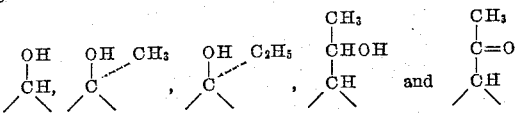

and R is a member selected from the group consisting of methyl and hydrogen.
2. 17α-methyl-A-nor-B-nortestosterone.
3. 17α-methyl-19-nor-A-nor-B-nortestosterone.
4. A-nor-B-norprogesterone.
5. 17α-methyl-A-nor-B-nortestosterone acetate.
6. A chemical compound of the formula:

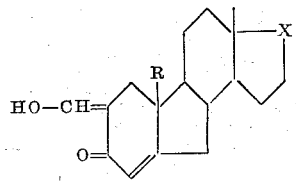

in which X is a member selected from the group consisting of

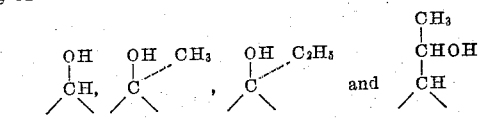

and R is a member selected from the group consisting of methyl and hydrogen.
7. 2-hydroxymethylene-17α-methyl-B-nortestosterone.
8. 2-hydroxymethylene-17α-methyl-19-nor-B-nortestosterone.
9. A chemical compound of the formula:

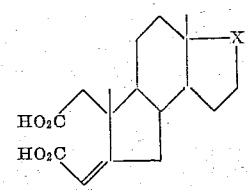

in which X is a member selected from the group consisting of

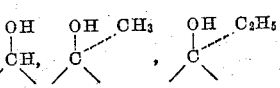

and

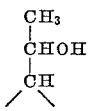

R is a member selected from the group consisting of methyl and hydrogen.

10. 17α-methyl-17β-hydroxy - 2,3-seco-B-norandrost-4-ene-2,3-dioic acid.

11. 17a-methyl-17β-hydroxy - 2,3 - seco-19-nor-B-norandrost-4-ene-2,3-dioic acid.

References Cited

UNITED STATES PATENTS 3,040,091  6/1962  Weisenborn _____ 260—586
3,210,406  10/1965  Weisenborn _____ 260—586

OTHER REFERENCES

Fieser and Fieser: Steroids, 1959, p. 572.

LORRAINE A. WEINBERGER, Primary Examiner.

VIVIAN GARNER, Assistant Examiner.